(12) United States Patent
Aoyama

(10) Patent No.: US 10,212,347 B2
(45) Date of Patent: Feb. 19, 2019

(54) IMAGE STABILIZING APPARATUS AND ITS CONTROL METHOD, IMAGE PICKUP APPARATUS, AND STORAGE MEDIUM

(71) Applicant: CANON KABUSHIKI KAISHA, Tokyo (JP)

(72) Inventor: Yuuzou Aoyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 61 days.

(21) Appl. No.: 15/421,622

(22) Filed: Feb. 1, 2017

(65) Prior Publication Data

US 2017/0223272 A1  Aug. 3, 2017

(30) Foreign Application Priority Data

Feb. 2, 2016 (JP) ................................ 2016-017752

(51) Int. Cl.
  *H04N 5/225* (2006.01)
  *H04N 5/232* (2006.01)
  *G06K 9/00* (2006.01)
(52) U.S. Cl.
  CPC ..... *H04N 5/23267* (2013.01); *G06K 9/00248* (2013.01); *H04N 5/23254* (2013.01); *H04N 5/23258* (2013.01)
(58) Field of Classification Search
  CPC ............. H04N 5/23267; H04N 5/2327; H04N 5/23274; H04N 5/23277; H04N 5/2329
  See application file for complete search history.

(56) References Cited

U.S. PATENT DOCUMENTS

| 2006/0256231 A1* | 11/2006 | Sasaki ................ H04N 5/23248 348/373 |
| 2007/0242937 A1* | 10/2007 | Sano ...................... G03B 17/18 396/55 |
| 2008/0111889 A1* | 5/2008 | Fujita ...................... H04N 5/145 348/208.5 |
| 2008/0174663 A1* | 7/2008 | Iwabuchi ........... H04N 5/23248 348/208.6 |
| 2010/0020244 A1* | 1/2010 | Mitsuya ............. H04N 5/23248 348/699 |
| 2011/0129167 A1* | 6/2011 | Nojima ................... G06T 5/003 382/266 |

(Continued)

FOREIGN PATENT DOCUMENTS

| JP | 2006-317848 A | 11/2006 |
| JP | 2007-336235 A | 12/2007 |
| JP | 2010-245774 A | 10/2010 |

*Primary Examiner* — Twyler L Haskins
*Assistant Examiner* — Dwight Alex C Tejano
(74) *Attorney, Agent, or Firm* — Cowan, Liebowitz & Latman, P.C.

(57) ABSTRACT

An image stabilizing apparatus includes a detection unit configured to detect motion vectors from a plurality of images acquired by an image sensor, a determination unit configured to determine a motion vector of an object among the motion vectors, a specifying unit configured to specify a target point in the images, and a control unit configured to provide an image stabilizing control based on the target point and a motion vector of the object. The control unit sets an image area in accordance with the motion vector of the object and the target point in the images, and provides the image stabilizing control based on the image area.

13 Claims, 18 Drawing Sheets

(56) References Cited

U.S. PATENT DOCUMENTS

2012/0019678 A1* 1/2012 Fujita ................. H04N 5/23245
348/208.4
2012/0113278 A1* 5/2012 Okada .................... H04N 5/217
348/208.4
2016/0269640 A1* 9/2016 Watanabe .......... H04N 5/23267

* cited by examiner

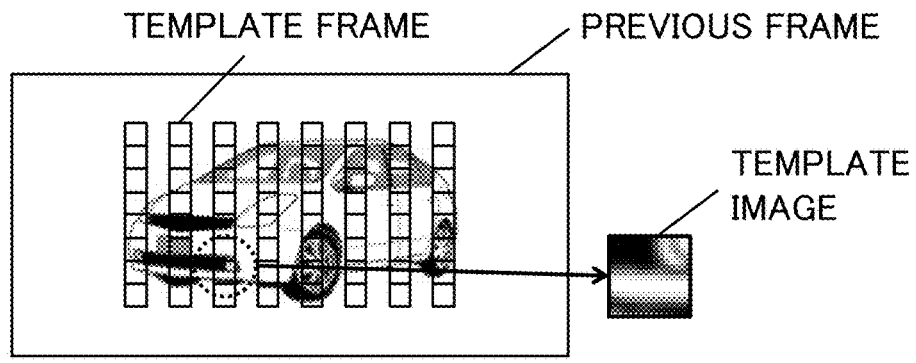
FIG. 11A
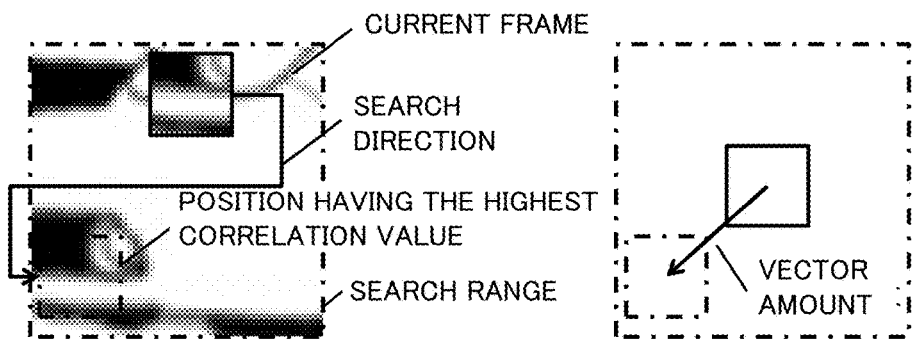
FIG. 11B
| FRAME NUMBER | HORIZONTAL MOTION VECTOR | VERTICAL MOTION VECTOR | ERROR NUMBER |
|---|---|---|---|
| [50] | 4.5[pixel] | −3.25[pixel] | 0 |
| [51] | 96[pixel] | 0.00390625[pixel] | 1 |
| [52] | 4.125[pixel] | −0.0625[pixel] | 2 |
⋮
FIG. 12

IMAGE STABILIZING APPARATUS AND ITS CONTROL METHOD, IMAGE PICKUP APPARATUS, AND STORAGE MEDIUM

BACKGROUND OF THE INVENTION

Field of the Invention

The present invention relates to an image stabilizing apparatus, and more particularly to an image stabilizing apparatus configured to assist a user in a follow shot.

Description of the Related Art

A method using an image stabilizing apparatus has conventionally been proposed as a technology for assisting a user (photographer) in a follow shot.

Japanese Patent Laid-Open No. ("JP") 2010-245774 discloses a technology for calculating an automatic release time period and an exposure time period based on at least one of the number of objects and the size of the object detected in a captured image in a follow shot image stabilizing mode.

JP 2006-317848 discloses a follow shot technology for detecting an angular velocity of an object based on a motion vector in an image and a blur detected by a gyro sensor, for calculating a correction amount for positioning the object at the image center based on the detected angular velocity, and for moving an optical axis shifting lens for the image stabilization.

JP 2007-336235 discloses a technology for classifying, through a histogram, motion vectors detected at feature points set to respective parts in an input image so as to discriminate an object from a background based on the motion vector in an image. JP 2007-336235 sets classification information representing a past classification result to each feature point and classifies the motion vector based on the classification information, when the motion vector obtained from a specific point is detected and the movement of the specific point is detected.

According to the prior art disclosed in JPs 2010-245774, 2006-317848, and 2007-336235, the calculated angular velocity of the object corresponds to a predetermined part of the object, but is not always a spot to be stopped by a photographer, because the angular velocity of the object does not always have a uniform value in angles of view. It is premised that the image stabilizing apparatus assists a follow shot of an object that provides a uniform linear motion. It is known that the object that provides the uniform linear motion does not have a constant angular velocity. FIG. 22 is a graph representing a relationship between the time and the angular velocity of the object that provides a uniform linear motion. As illustrated in FIG. 22, the angular velocity is maximum at time of 0. This means that a distance is minimum between the object and the photographer at time of 0, and an apparent velocity of the object is maximum since a locus of the object is orthogonal to a sight line of the photographer. As illustrated in FIG. 22, the angular velocity reduces with time. This means that a distance increases between the object and the photographer with time, and the apparent velocity of the object reduces. FIG. 23 illustrates an angle of view of the camera in a predetermined time period illustrated by a dotted line illustrated in FIG. 22. FIG. 23 is a graph representing a relationship between an image height and an angular velocity in an angle of view in a predetermined time period. The prior art uniformly sets a detecting position of a motion vector in the angles of view, discriminates the object from the background, and calculates the motion vectors of the object and the background by averaging the respective vectors irrespective of the image height. The angular velocity of the object calculated from the calculated motion vector may be an angular velocity at the center of the angle of view. For example, when the photographer sets a distance measuring position on the left side of the object, the distance measuring position is likely to be the very position at which the photographer would like to stop the object in the follow shot. In other words, the angular velocity of the distance measuring position is the position to be calculated as the angular velocity of the object. However, the prior art cannot calculate the angular velocity at the distance measuring position, and obtains an image having a blurred spot at which the photographer would like to stop. Moreover, the motion vector of the spot cannot be properly detected and thus the image blur increases, if the distance measuring position has a low contrast or contains a repetitive pattern.

SUMMARY OF THE INVENTION

The present invention provides an image stabilizing control advantageous to a follow shot assistance.

An image stabilizing apparatus according to one aspect of the present invention includes one or more processors, and a memory storing instructions which, when executed by the one or more processors, cause the image stabilizing apparatus to function as a detection unit configured to detect motion vectors from a plurality of images acquired by an image sensor, a determination unit configured to determine a motion vector of an object among the motion vectors, a specifying unit configured to specify a target point in the images, and a control unit configured to provide an image stabilizing control based on the target point and a motion vector of the object. The control unit sets an image area in accordance with the motion vector of the object and the target point in the images, and provides the image stabilizing control based on the image area.

Further features of the present invention will become apparent from the following description of exemplary embodiments with reference to the attached drawings.

BRIEF DESCRIPTION OF THE DRAWINGS

FIGS. 11A and 11B are views for explaining a detection of a motion vector according to the embodiments of the present invention.

FIG. 12 is a table representing a detection result of the motion vector according to the embodiments of the present invention.

FIGS. 20A-20D are views for explaining a determination method of a target image according to a second embodiment.

DESCRIPTION OF THE EMBODIMENTS

A detailed description will be given of embodiments of the present invention, with reference to the accompanying drawings.

First Embodiment

A description will be given of a motion vector detection apparatus according to a first embodiment of the present invention.

Figure 2:
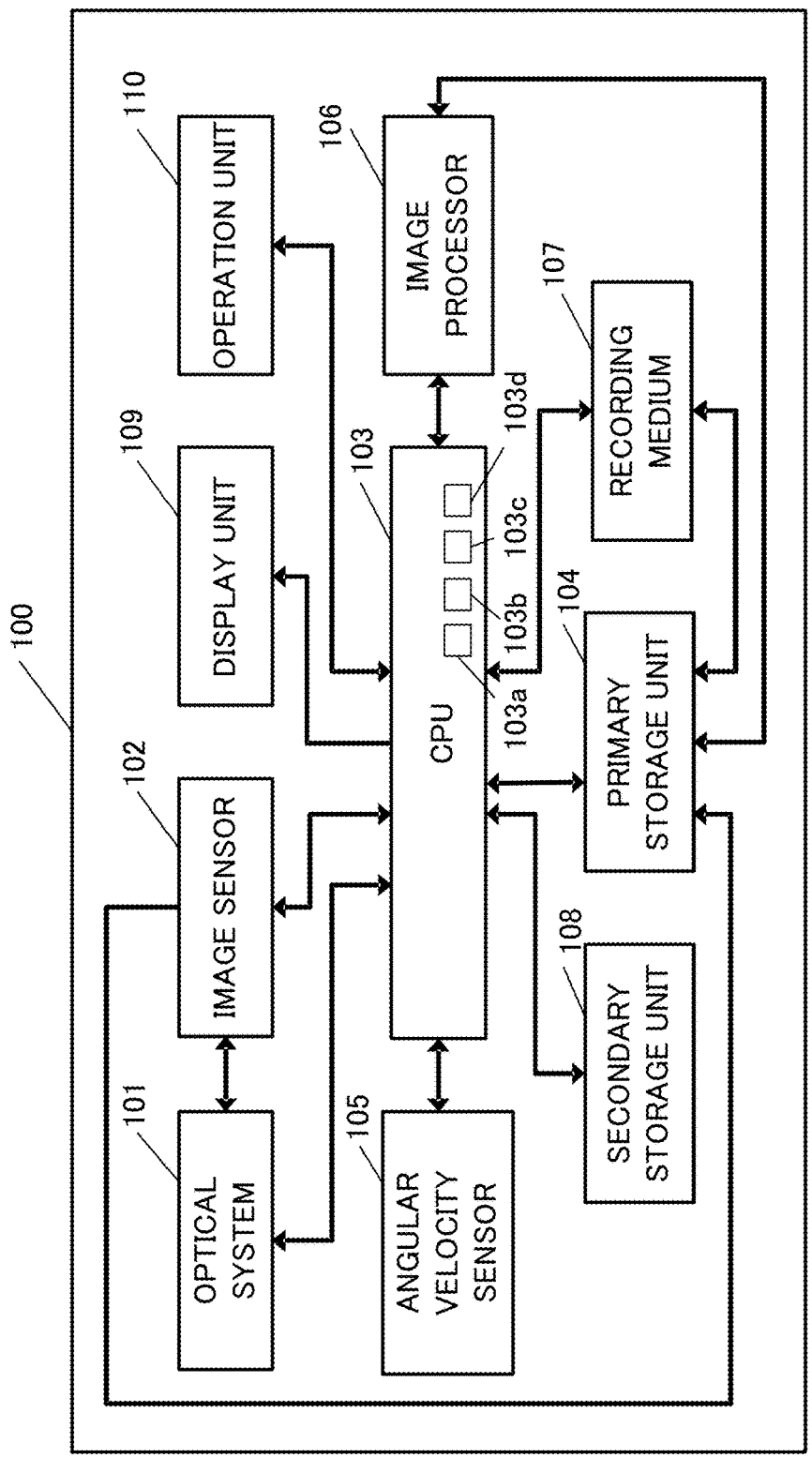
FIG. 2 is a block configuration diagram of an image pickup apparatus according to the embodiments of the present invention.

FIG. 2 is a block configuration diagram of an image pickup apparatus according to an embodiment of the present invention. An image pickup apparatus 100 may be an arbitrary electronic apparatus having a camera function, a cellular phone with a camera function and a camera attached computer, as well as a camera, such as a digital still camera and a digital video camera. An optical system 101 includes a lens, a shutter, and a diaphragm, and forms an optical image of an object on an image sensor 102 using light from the object under control of a CPU 103. The optical system 101 includes an image stabilizing lens (optical element) used to assist a user in a follow shot. The image sensor 102 includes a photoelectric converter, such as a CCD image sensor and a CMOS image sensor, and converts the imaged light from the optical system 101 into an image signal.

An angular velocity sensor 105, such as a gyro sensor, detects an angular velocity as a moving amount of the image pickup apparatus 100, converts the detection result into an electric signal, and transmits it to the CPU 103. The angular velocity sensor 105 may be included in the optical system 101. The CPU 103 controls each component in the image pickup apparatus 100 in accordance with an input signal and a previously installed program so as to implement the functions of the image pickup apparatus 100. The primary storage unit 104 is a volatile unit, such as a RAM, configured to temporarily store data for use with transactions of the CPU 103. In addition, information stored in the primary storage unit 104 may be used by an image processor 106, or recorded in a recording medium 107. A secondary storage unit 108 is a nonvolatile storage device, such as an EEPROM, configured to store a program (firmware) used to control the image pickup apparatus 100 and various setting information for use with the CPU 103.

The recording medium 107 records image data, etc. obtained by image capturing and stored in the primary storage unit 104. The recording medium 107 is detachable from the image pickup apparatus 100, for example, like a semiconductor memory card, and the recorded data can be read out when it is attached to the personal computer. The image pickup apparatus 100 has an attachment/detachment mechanism of the recording medium 107, and a read/write function. A display unit 109 displays a viewfinder image in the image capturing, a captured image, a GUI image for a dialogue operation, etc. An operation unit 110 includes input devices, such as a button, a lever, a touch panel, and input units using a voice or a sight line, configured to receive an operation of the user and to send input information to the CPU 103.

The image pickup apparatus 100 according to this embodiment includes a plurality of image processing patterns applied to the captured image by the image processor 106, and can set the pattern as an image capturing mode through the operation unit 110. The image processor 106 adjusts a tone in accordance with an image capturing mode as well as image processing called a development process. The CPU 103 may implement at least part of the functions of the image processor 106 through software.

Figure 6:
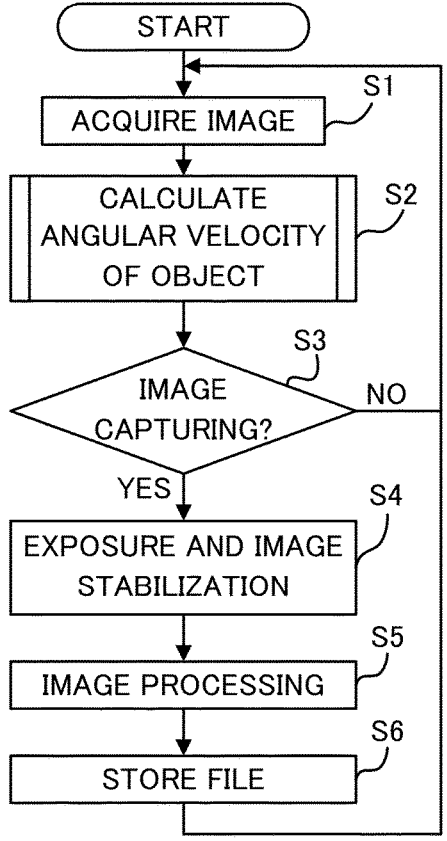
FIG. 6 is a flowchart of a follow shot assistance process according to the embodiments of the present invention.

A description will be given of processing by the CPU 103 in the follow shot for the image stabilizing apparatus (referred to as a "follow shot assisting unit" hereinafter) configured to drive the image stabilizing lens so as to absorb the influence of a difference between the moving velocity of the object and the panning velocity of the photographer. FIG. 6 is a flowchart of a process for implementing a follow shot assisting function. The CPU 103 starts this process in response to an input from the operation unit 110, such as power-on of a power button and a live-view start command.

In the step S1, the CPU 103 controls the optical system 101 and the image sensor 102, and acquires an image. The acquired image is stored in the primary storage unit 104. When it is processed by the image processor 106 and transmitted to the display unit 109, it is displayed as a viewfinder image.

Next, in the step S2, the CPU 103 calculates an angular velocity of the object. The calculated angular velocity is transferred to the optical system 101 and used to stabilize an image of the object. The display unit 109 may display a position of a detection frame used to calculate the angular velocity in the step S2.

Next, in the step S3, the CPU 103 determines whether the image is to be captured. The CPU 103 may determine whether the image is to be captured, based on an image capturing command from the user through the operation unit 110 or an analysis result of the image obtained from the image sensor 102.

When the image is to be captured, the CPU 103 provides exposure and image stabilization in the step S4. In exposure, the CPU 103 controls the optical system 101 and adjusts the light quantity entering the image sensor 102 through the optical system 101. In image stabilization, the CPU 103 controls the optical system 101 so as to stabilize an image of the object based on a difference between an angular velocity obtained from the angular velocity sensor 105 and an angular velocity of the object calculated in the step S2. The CPU 103 serves as a control unit configured to provide an image stabilizing control by using an optical element (which is an "image stabilizing lens") based on a motion vector (or an angular velocity) of the object. This embodiment provides an image stabilizing control for assisting a user in a follow shot. When the optical system 101 includes an angular velocity sensor, the optical system 101 may provide the image stabilization.

This embodiment uses a so-called optical image stabilization configured to move the image stabilizing lens on a plane perpendicular to the optical axis in the image stabilization. The image stabilization of the present invention is not limited to the optical image stabilization, and may move the image sensor on a plane perpendicular to the optical axis. An electronic image stabilization may be used which reduces the influence of the vibration by changing a cutout position in each image pickup frame output from the image sensor. The image stabilization may combine a plurality of methods. The optical element moved for the image stabilization may be at least one of the image stabilizing lens and the image sensor.

Next, when the exposure ends, the CPU 103 controls the image processor 106 and develops the image obtained from the image sensor 102 in the step S5.

Next, the CPU 103 stores the developed image in the recording medium 107 in the step S6, and the flow returns to the step S1.

When the image is not to be captured in the step S3, the CPU 103 repeats the processes of the steps S1 and S2 until the image capturing is determined necessary in the step S3.

Figure 7:
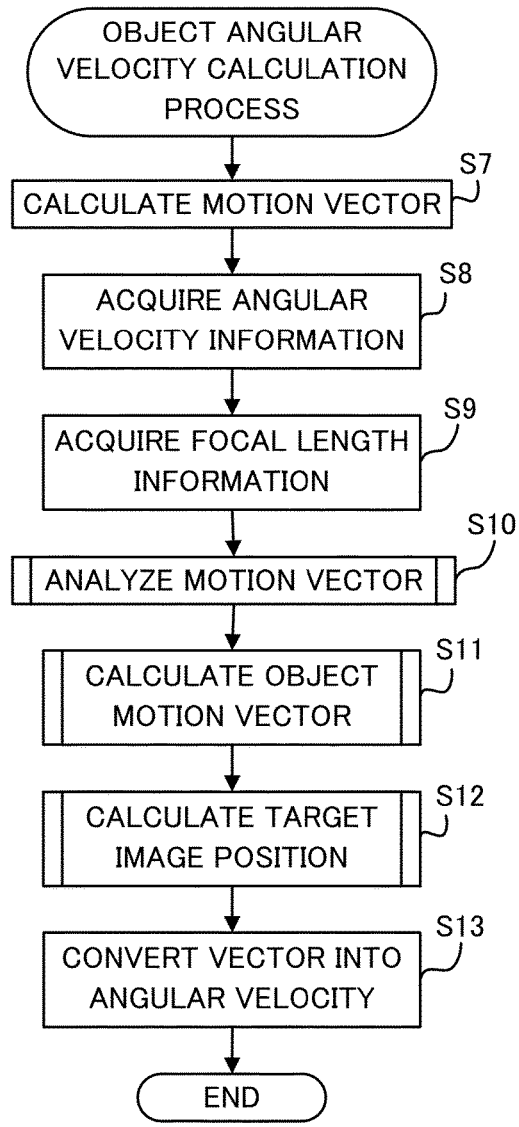
FIG. 7 is a flowchart of an object angular velocity calculation process according to the embodiments of the present invention.

Referring now to FIG. 7, a description will be given of the object angular velocity calculation process of the CPU 103 in the step S2. FIG. 7 is a flowchart of the object angular velocity calculation process.

When the object angular velocity calculation process starts, the CPU 103 calculates the motion vector using the image obtained from the image sensor 102 in the step S7, and stores the motion vector information in the primary storage unit 104.

Next, the CPU 103 obtains angular velocity information from the angular velocity sensor 105 in the step S8, and stores the angular velocity information in the primary storage unit 104.

Next, the CPU 103 obtains focal length information from the optical system 101 in the step S9, and stores the focal length information in the primary storage unit 104.

Next, the CPU 103 analyzes the motion vector in the step S10. The motion vector analysis process generates the object motion vector information based on the angular velocity information obtained in the step S8, the focal length information obtained in the step S9, and the motion vector information obtained in the step S7.

Next, the CPU 103 calculates the object motion vector in the step S11. The object motion vector calculation process calculates the object motion vector based on the object motion vector information obtained in the step S10 and the distance measuring position information.

Next, the CPU 103 calculates the target image position in the step S12. The target image position calculation process calculates the target image position based on the image obtained in the step S1, the motion vector information obtained in the step S7, and the distance measuring position information.

Finally, the CPU 103 converts the object motion vector obtained in the step S11 into the angular velocity and calculates the object angular velocity with the angular velocity information in the step S13.

Figure 3:
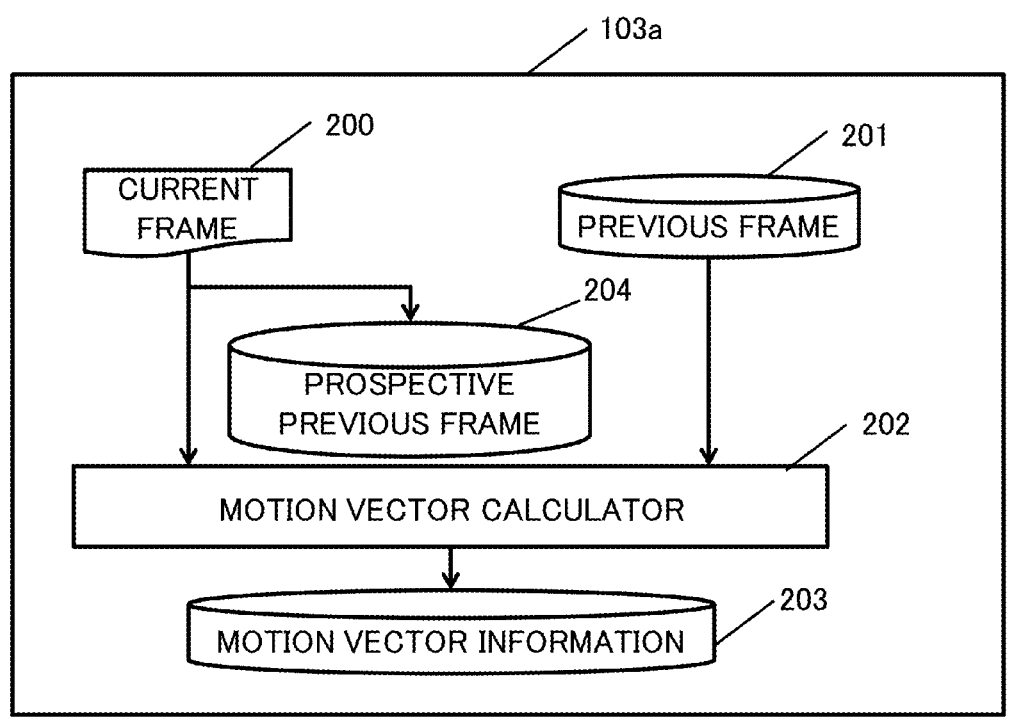
FIG. 3 is a block configuration diagram of a motion vector detector according to the embodiments of the present invention.

Referring now to FIG. 3, a description will be given of the motion vector calculation process in the step S7. FIG. 3 is a block diagram of the motion vector detector 103*a* configured to calculate the motion vector in the step S7. The motion vector detector 103*a* serves as a detection unit provided in the CPU 103 and configured to detect the motion vector based on a plurality of images obtained from the image sensor 102.

The current frame 200 is an image obtained by the image sensor 102 in the step S1 at the predetermined time. The current frame 200 is stored in the primary storage unit 104 as a prospective previous frame 204 and used for the process of the next frame.

The previous frame 201 is an image obtained by the image sensor 102 in the step S1 one frame before the predetermined time. The previous frame 201 has been stored as the prospective previous frame in the primary storage unit 104, and is read out of the primary storage unit 104 when the CPU 103 calculates the motion vector in the step S7.

Next, the motion vector calculator 202 receives the current frame 200 and the previous frame 201, and calculates the motion vector between frames.

Finally, the motion vector calculated by the motion vector calculator 202 is stored as the motion vector information 203 in the primary storage unit 104.

Referring now to FIGS. 11A, 11B, and 12, a description will be given of the process by the motion vector calculator 202. FIGS. 11A and 11B illustrate a motion vector detecting method using a general template matching method. FIG. 12 illustrates an illustrative result of the detected motion vector.

As illustrated in FIG. 11A, there are eight horizontal template frames and eight vertical template frames, totally 64 template frames in the previous frame image, and the image in each template frame is acquired as a template image.

Next, as illustrated in FIG. 11B, a search range is set in the current frame image. The center of the search range is set to the center of the template frame. The motion vector is obtained by comparing the template image with the current frame for each one pixel in the search range from the upper left to the lower right, and by searching the position having the highest correlation value.

The CPU 103 may set values read out of the secondary storage unit 108 to the size of the template frame, the number of arranged frames, and the size of the search range in the step S7. Alternatively, the CPU 103 may set the value read out of the secondary storage unit 108 to the initial value and change the values whenever the step S7 is executed. This embodiment provides spaces between frames in the horizontal frame arrangement, but the arrangement method is not limited this embodiment. For example, a non-spacing arrangement may be used as in the vertical direction or spaces may be provided in the vertical direction.

A frame number illustrated in FIG. 12 represents a template frame having a detected vector, and is arranged in order from the upper left. In the template frame exemplified in FIGS. 11A and 11B, the frame number is 50.

The horizontal motion vector and the vertical motion vector have numerical values obtained by the difference between the position of the template frame set in the previous image and the position having the highest correlation value in the current frame image, and are calculated in each of the horizontal and vertical directions. The vector amount has a unit of pixel, and is represented by 8-bit fixed-point format. The maximum values are determined by the area of the search range, and ±96 pixels in this embodiment. The code represents the moving direction, a positive value is set to the left side in the horizontal direction and a motion vector amount is 4.5 pixels. A negative value is set to the downside in the vertical direction, and a motion vector amount is −3.25 pixels.

Finally, the error number represents whether the vector has been normally detected and 0 means a normal end. For example, an error number of 1 for frame number 51 means a detection failure due to the low contrast. The low contrast occurs when the template image or search range has no contrast and correlation values are high at any positions. An error number of 2 for frame number 52 means a detection of a repetitive pattern. The repetitive pattern occurs when a position having a high correlation value is periodically obtained, where the template frame and the search range contain a high frequency and high contrast pattern.

Figure 10:
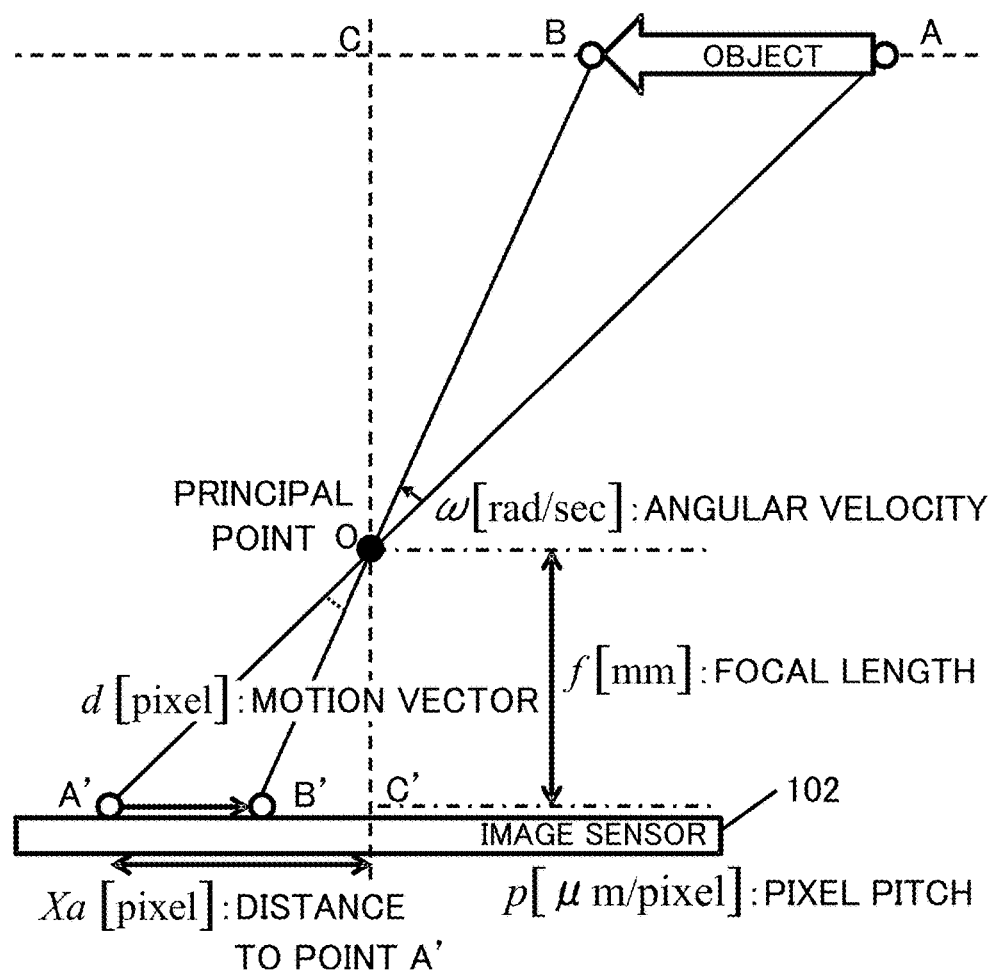
FIG. 10 is a view representing a relationship between an angular velocity and a vector amount according to the embodiments of the present invention.

Referring now to FIG. 10, a description will be given of a conversion from a vector to an angular velocity in the step S13. FIG. 10 illustrates a relationship between the motion of the object and the motion at the object position on the image sensor 102.

Assume that d is a vector amount calculated in the step S11, and a position A' on the image sensor 102 is a detected position based on the vector calculated in the step S11. A position B' on the image sensor 102 is a position to which the position A' is moved by d. A difference between an angle A'OB' and an angle B'OC' is expressed as a $\tan(X_a/f) - \tan((X_a-d)/f)$ where C' is a center position on the image sensor 102 and $X_a$ is a distance between the positions A' and C'.

Now assume that T is a time period from when the previous frame image is obtained to when the current frame image is obtained. A reciprocal of T is a frame rate. Since an angular velocity is a time variation amount of an angle, an angular velocity ω of the object can be expressed as an angle A'OB'/T.

Expression 1 is a conversion expression from the motion vector amount d to an angular velocity ω as follows:

$$\omega = \frac{1}{T} \times \tan^{-1}\left(\frac{fd}{f^2 + X_a^2 - X_a d}\right) \quad \text{EXPRESSION 1}$$

Figure 4:
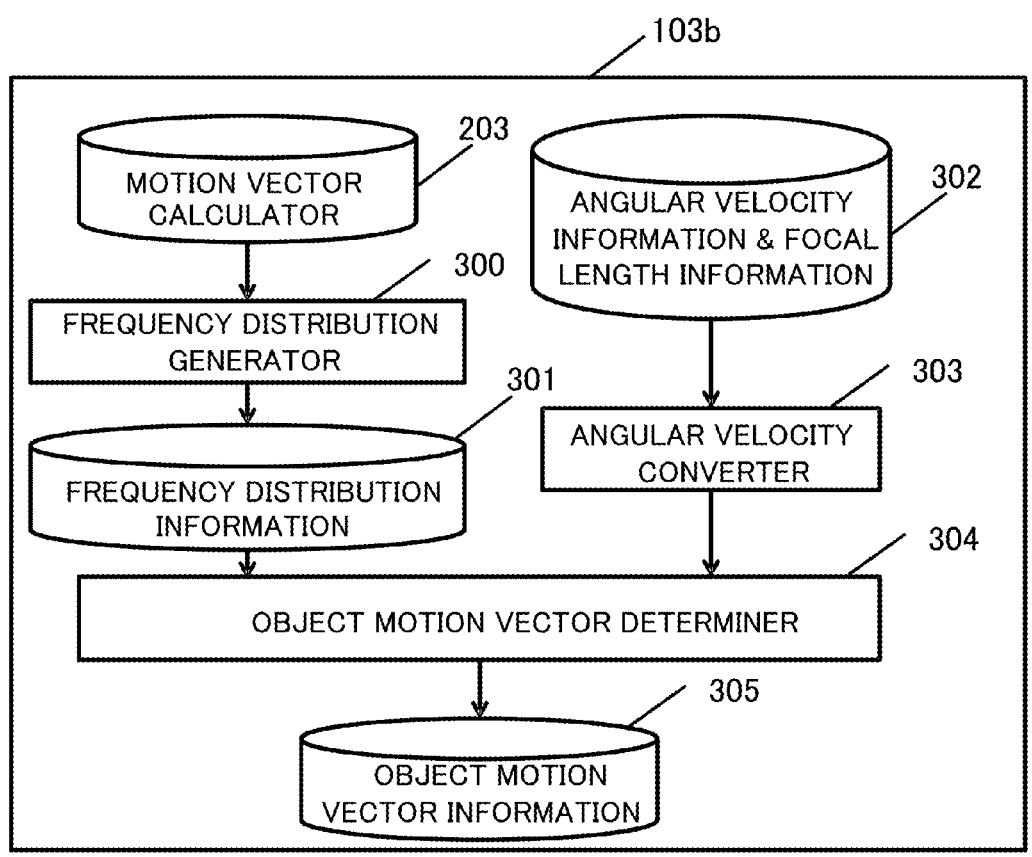
FIG. 4 is a block configuration diagram of a motion vector analyzer according to the embodiments of the present invention.
Figure 8:
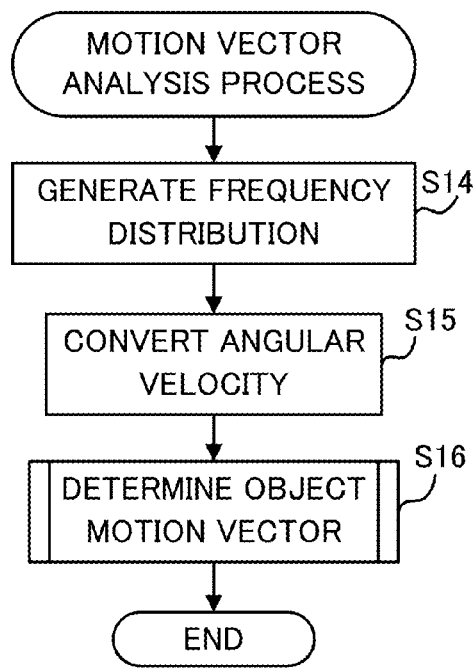
FIG. 8 is a flowchart of a motion vector analysis process according to the embodiments of the present invention.

Referring now to FIGS. 8 and 4, a description will be given of the motion vector analysis process by the CPU 103 in the step S10. FIG. 8 is a flowchart of the motion vector analysis process. FIG. 4 is a block diagram of the motion vector analyzer 103b. The motion vector analyzer 103b serves as a determination unit provided in the CPU 103 and configured to determine the motion vector of the (main) object other than the background in the motion vector detected by the motion vector detector 103a.

When the motion vector analysis process starts, the CPU 103 generates a frequency distribution in the step S14. The CPU 103 reads the motion vector information 203 from the primary storage unit 104, and inputs it into the frequency distribution generator 300. The frequency distribution generator 300 reads error information from the input motion vector information, and extracts only the motion vector that has normally ended. The horizontal and vertical motion vectors are read out of the extracted motion vector information, and the frequency distribution is generated in each direction. The CPU 103 temporarily stores the frequency distribution information 301 generated by the frequency distribution generator 300, in the primary storage unit 104.

Next, the CPU 103 converts the angular velocity information into the vector amount in the step S15. The CPU 103 reads the angular velocity information and focal length information 302 from the primary storage unit 104, inputs it into the angular velocity converter 303, and converts the panning angular velocity into the vector amount.

Next, the CPU 103 determines the object motion vector in the step S16. The CPU 103 reads the frequency distribution information 301 from the primary storage unit 104, and inputs it with the vector amount converted by the angular velocity converter 303 into the object motion vector determiner 304.

Finally, the CPU 103 stores the object motion vector information 305 generated by the object motion vector determiner 304, in the primary storage unit 104, and ends the motion vector analysis process.

Figure 13A:
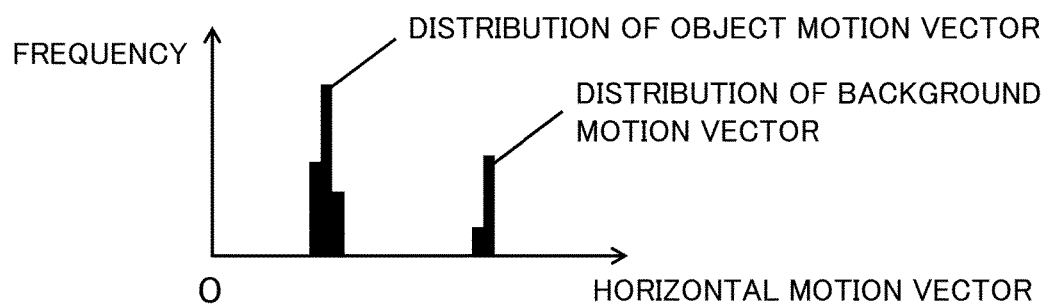
FIGS. 13A and 13B are views for explaining a frequency distribution according to the embodiments of the present invention.
Figure 13B:
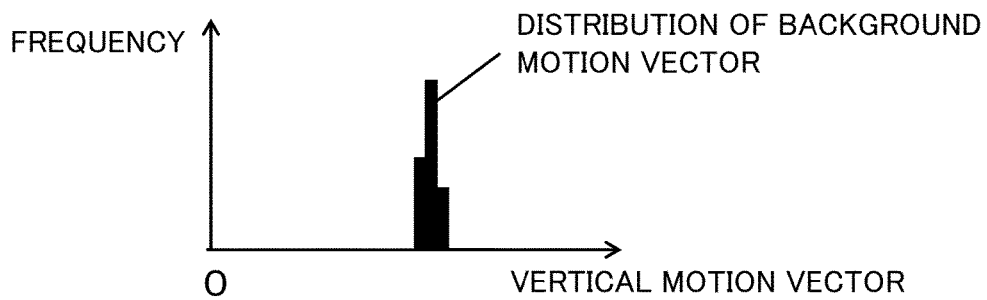

Referring now to FIGS. 13A and 13B, a description will be given of the frequency distribution generating process by the frequency distribution generator 300 in the step S14. FIGS. 13A and 13B illustrate illustrative frequency distributions when the camera is panned in the horizontal direction for the object moving in the horizontal direction.

Initially, as illustrated in FIG. 12, the motion vector amount is expressed by 8-bit fixed-point format, but a decimal point is rounded down in generating the frequency distribution.

Next, all values are converted into positive values by adding a maximum value of 96 so as to facilitate the calculation.

As a result, as illustrated in FIG. 13A, two distributions, or the object motion vector distribution and the background motion vector distribution, appear in the frequency distribution generated from the horizontal motion vector.

As illustrated in FIG. 13B, only the background motion vector distribution appears in the frequency distribution generated from the vertical motion vector.

Referring now to FIG. 10, a description will be given of the angular velocity conversion process by the angular velocity converter 303 in the step S15.

Assume that ω is an angular velocity of the camera. When the camera stands still, the angular velocity of the object accords with the angular velocity of the camera.

Now assume that A is a position of the object at time when the previous frame image is obtained. Then, the object is imaged at the position A' on the image sensor 102 through a principal point O.

Now assume that B is a position of the object at time when the current frame is obtained. Then, the object is imaged at the position B' on the image sensor 102 through the principal point O. The motion vector amount after the angular velocity ω is converted is a distance A'B', which is set to d.

The angle AOB can be expressed as ω×T based on the time period T and the angular velocity ω of the camera.

Now assume that a point C is an intersection between the optical axis and the locus of the object, and a point C' is an intersection between the optical axis and the image sensor 102. The optical axis is perpendicular to the locus of the object and the image sensor 102 and passes the principal point O. For simplicity, assume that the locus of the object that passes the object positions A and B is parallel to the image sensor 102. In addition, f is a distance between the principal point O and the point C', and means a focal length.

Next, Xa is a distance from the point A' to the point C'. The angle A'OB' is calculated based on the difference between the angle A'OC' and the angle B'OC', as a tan(Xa/f)−a tan((Xa−d)/f).

Finally, a triangle AOC is similar to a triangle A'OC', and a triangle BOC is similar to a triangle B'OC'. The angle AOB is equal to the angle A'OB'. Expression 2 is a conversion expression from the angular velocity ω of the camera to the motion vector amount d.

$$d = \frac{f^2\tan(\omega T) + X_a^2\tan(\omega T)}{f + X_a^2\tan(\omega T)} \quad \text{EXPRESSION 2}$$

Figure 9:
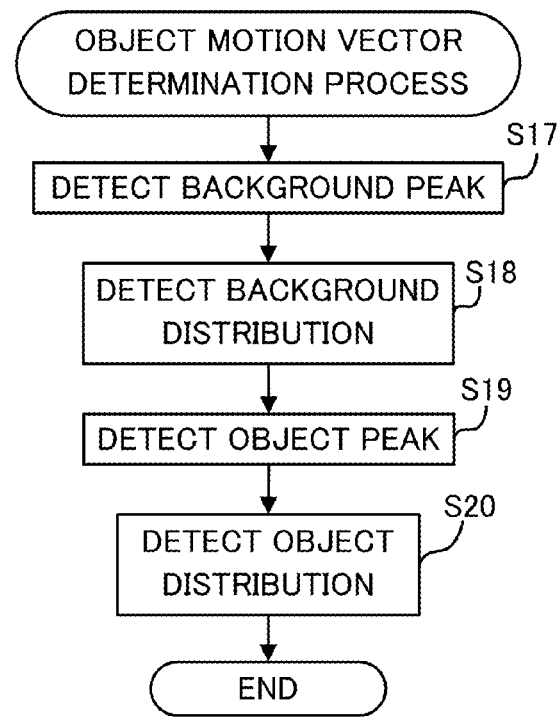
FIG. 9 is a flowchart of an object distribution detection process according to the embodiments of the present invention.

Referring now to FIG. 9, a description will be given of the object motion vector determination process by the object motion vector determiner 304 in the step S16. FIG. 9 is a flowchart of the object motion vector determination process.

When the object motion vector determination process starts, the CPU 103 detects the background peak from the frequency distribution information 301 in the step S17. The background peak is detected based on the motion vector amount (referred to as a "gyro vector amount" hereinafter) converted from the panning angular velocity of the camera input from the angular velocity converter 303. As described for the angular velocity converter 303, the vector amount of the background corresponds to the gyro vector amount. A background peak is a vector that has a frequency larger than a threshold near the gyro vector amount. The background peak and the gyro vector amount do not perfectly accord with each other due to the precision and timing for detecting the angular velocity of the angular velocity sensor 105. Now, a predetermined range with a center of the gyro vector amount is set to the background search range. An area of the search range and the frequency threshold may be previously stored in and read out of the secondary storage unit 108. A value stored in the secondary storage unit 108 may be set to the initial value and changed in accordance with the angular velocity and focal length or the shift amount from the peak.

Next, the CPU 103 detects the background distribution in the step S18. As illustrated in FIGS. 13A and 13B, the background vector has a predetermined spread of distribution. This spread is caused by the detective error of the vector or a rounded error in generating the frequency distribution. Therefore, a range of frequencies in the frequency distribution is checked based on the background peak detected in the step S17, and the background distribution is set to a range in which the frequencies in the frequency distribution are lower than the predetermined threshold. This threshold may be previously stored in and read out of the secondary storage unit 108. The threshold may be changed in accordance with the frequency of the background peak or the total frequency of the frequency distribution.

Next, the CPU 103 detects the object peak in the step S19. A peak is searched in a range other than the range detected as the background distribution in the step S18, and an object peak higher than the threshold is set. The threshold may be the value used in the step S17 or another value.

Finally, the CPU 103 detects the object distribution in the step S20. The detection method is the same as that used to detect the background distribution in the step S18, but the threshold may be set to a value equal to or different from that used to detect the background distribution.

Figure 1:
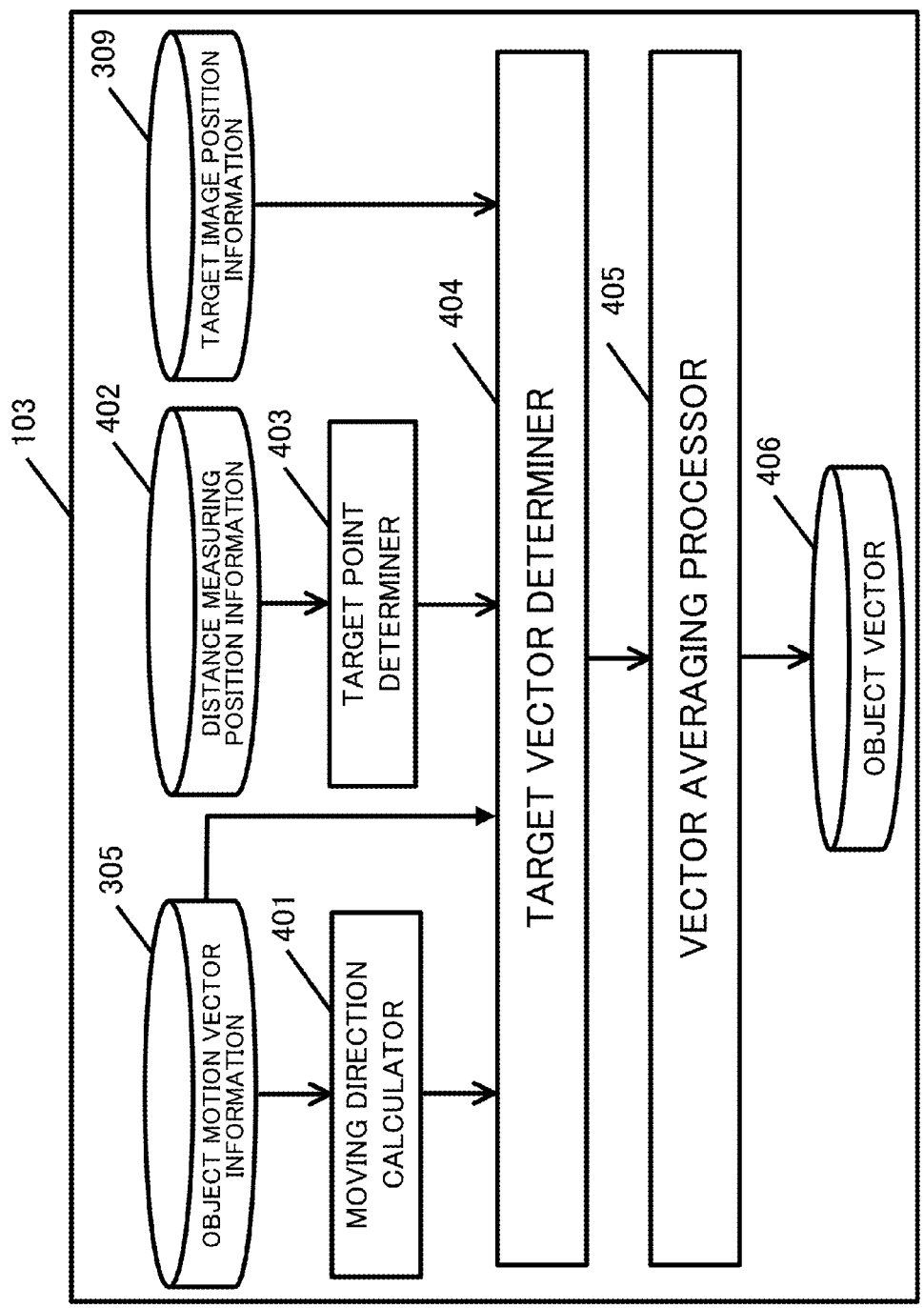
FIG. 1 is a block configuration diagram of an object motion vector calculator according to embodiments of the present invention.

Referring now to FIG. 1, a description will be given of the object motion vector calculation process in the step S11. FIG. 1 is a block diagram of the object motion vector calculator 103c. The object motion vector calculator 103c serves as an object vector calculation unit provided in the CPU 103 and configured to calculate a target motion vector (object vector) in calculating the angular velocity of the object, among motion vectors of the object.

When the object motion vector calculation process starts, the CPU 103 inputs the object motion vector information 305 read out of the primary storage unit 104, in the moving direction calculator 401, and calculates the moving direction of the object. Thus, the moving direction calculator 401 serves as a calculating unit configured to calculate the moving direction of the object based on the motion vector of the main object. The moving direction is calculated based on the vector amounts of the horizontal and vertical object peaks detected in the step S19 and the gyro vector amount.

Where Vph is a vector amount of the horizontal object peak, Vpv is a vector amount of the vertical object peak, Voh is a gyro vector amount in the horizontal direction, and Vov is a gyro vector amount in the vertical direction, then Expression 3 represents a slope α in the moving direction.

$$\alpha = \frac{V_{ov} - V_{pv}}{V_{oh} - V_{ph}} \quad \text{EXPRESSION 3}$$

Assume that the angular velocity becomes positive when the camera is panned in the right or upper direction. Then, its code is reverse to the code of the motion vector, and Expression 2 subtracts the peak vector amount.

Next, the CPU 103 inputs the distance measuring position information 402 read out of the primary storage unit 104, in the target point determiner 403, and determines the target point. This embodiment sets the position of the target point to the center coordinate in the detection frame in which a distance between the center of the input distance measuring position and the center of the detection frame coordinate is minimum. This embodiment uses the distance measuring position information 402 for an input of the target point determination, but the target point determination is not limited to the measuring distance position. For example, the face detection result or the object area detection result may be input. The photographer may input the position through the operation unit 110.

Next, the CPU 103 inputs the object motion vector information 305 read out of the primary storage unit 104, the moving direction of the object calculated by the moving direction calculator 401, and the target point determined by the target point determiner 403, in the target vector determiner 404, and determines the target vector.

Finally, the CPU 103 inputs the target vector determined by the target vector determiner 404 in the vector averaging processor 405, and calculates the object vector 406 by averaging the object motion vectors determined as the target vector, and stores it in the primary storage unit 104.

Figure 5:
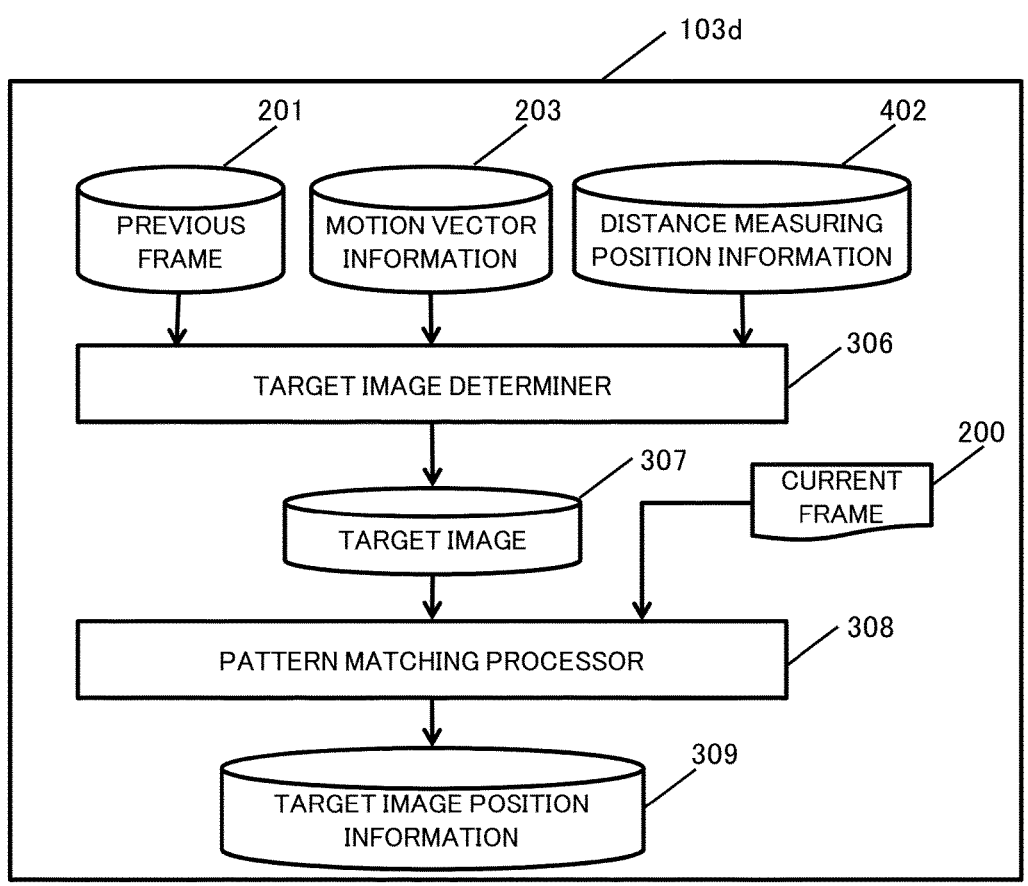
FIG. 5 is a block configuration diagram of a target image position calculator according to the embodiments of the present invention.
Figure 14:
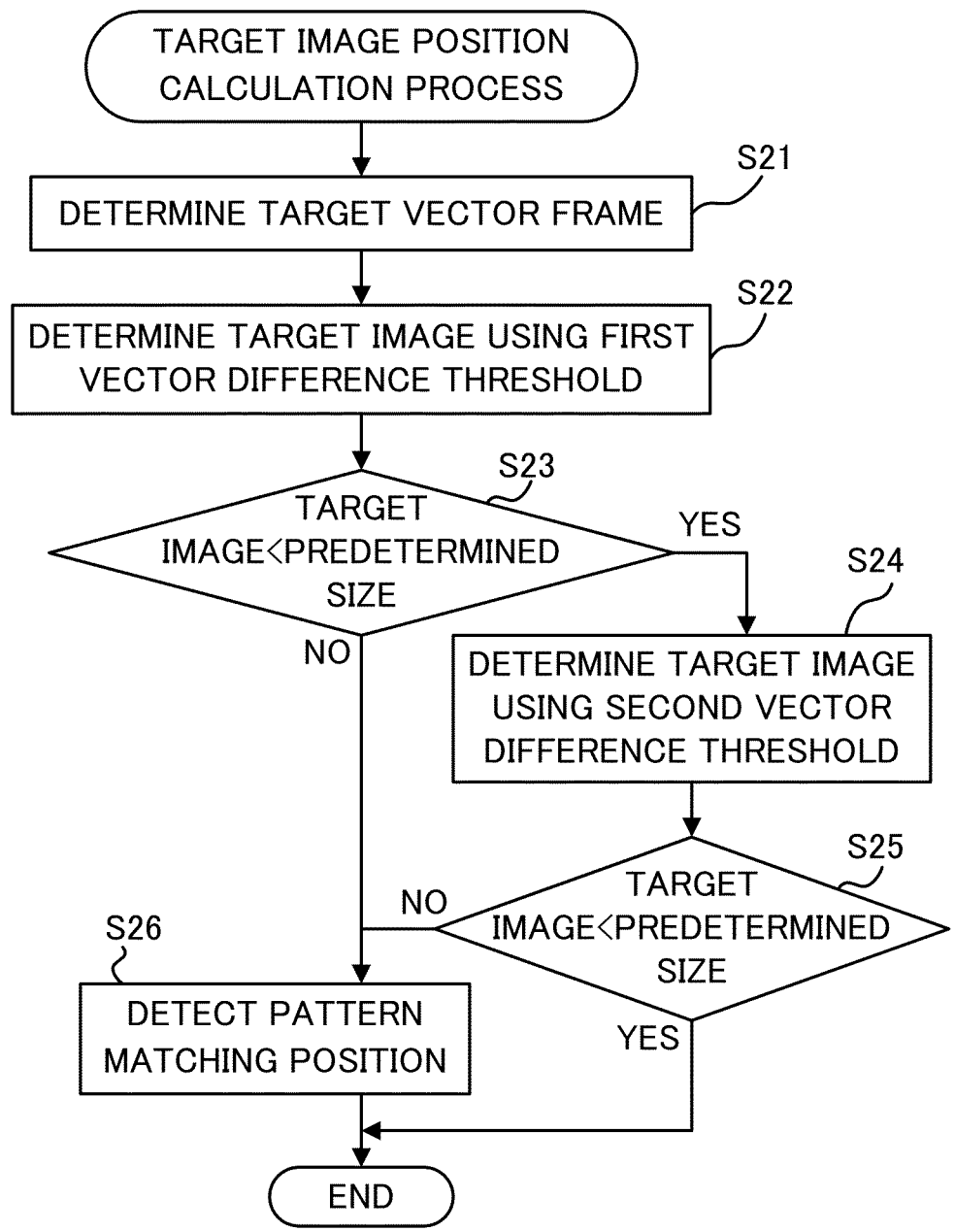
FIG. 14 is a flowchart of a target image position calculation process according to the embodiments of the present invention.

Referring now to FIGS. 5, 15A-D, and 16, a description will be given of the target image position calculation process in the step S12 according to the first embodiment. FIG. 5 is a block diagram of the target pixel position calculator 103d. The target pixel position calculator 103d serves as a specifying unit provided in the CPU 103, and configured to specify an addressed point (referred to as a "target point" hereinafter) addressed by a user in the images acquired by the image sensor 102 by acquiring the distance measuring information 402. FIG. 14 is a flowchart of the target image position calculation process.

The target image is an image that includes a similar vector component near the target point determined by the target point determiner 403. In other words, the target image is regarded as an object image having a motion vector component addressed by the user.

When the target image position calculation process starts, the CPU 103 inputs the previous frame 201, the motion vector information 203, and the distance measuring position information 402 stored in the primary storage unit 104, in the target image determiner 306, and extracts the target image based on part of the previous frame image.

Initially, the CPU 103 determines the target vector frame in the step S21. This embodiment sets the position of the target vector frame to the center coordinate in the detection frame in which a distance between the center of the input distance measuring position and the center of the detection frame coordinate is minimum. The target pixel position calculator 103d specifies the target vector frame based on the distance measuring position information 402 in the step S21. This embodiment uses the distance measuring position information 402 as an input of the target point determination, but the target point determination is not limited to the measuring distance position. For example, the face detection result may be input. The target pixel position calculator 103d may specify the target vector frame based on the face position information of the main object. The detection result of the object area may be input.

Next, the CPU 103 calculates a difference from the motion vector detected with the target vector frame based on the motion vector information 203. The difference from the motion vector may use both the vertical direction and the horizontal direction or only the vector component in the panning direction of the camera.

Figure 15:
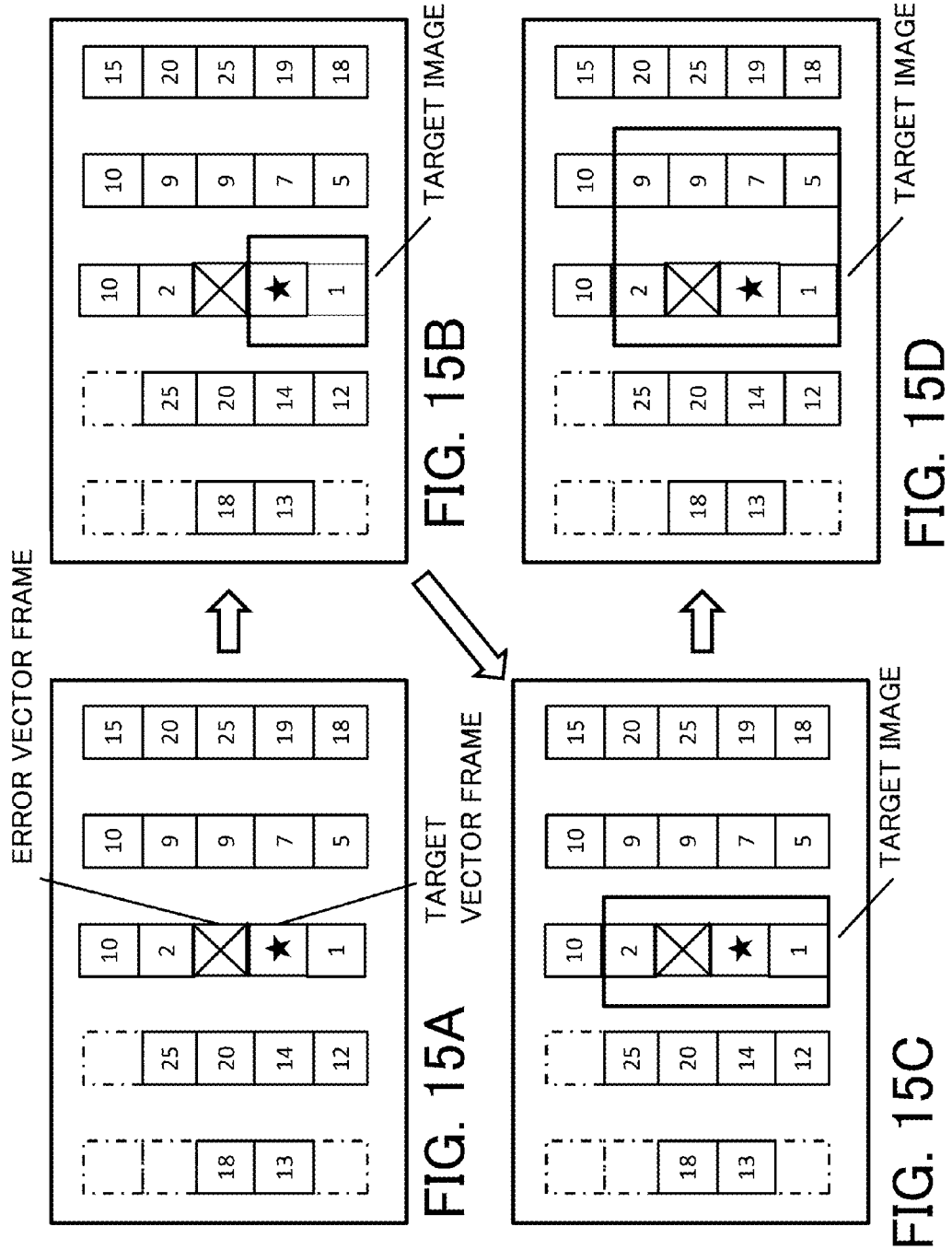
FIGS. 15A-15D are views for explaining a determination method of a target image according to a first embodiment.

FIG. 15A is a view illustrating a difference of a motion vector near the target vector frame. A numerical value described in the frame represents the vector difference from the target vector frame.

The CPU 103 determines a similar motion vector based on the detection frame next to the target vector frame, and sets to the target image, a rectangular area that contains the vector detection frame that is determined similar.

In the step S22, the CPU 103 determines a target image having a motion vector difference smaller than the first threshold. Thus, the target image (image area) is set so as to contain a motion vector with a difference from the motion vector, which is detected at a position (target vector frame) determined closest to the target point addressed by the user, smaller than the first threshold. This embodiment sets the first threshold to "5."

The vector detection frame located under the target vector frame has a motion vector difference of 1 smaller than the first threshold, and FIG. 15B illustrates the result that the target image contains this detection frame.

The vector detection frame above the target vector frame is determined as an error, but the vector frame next to this error vector detection frame in the upper direction has a motion vector difference of 2 smaller than the first threshold. It is estimated that the vector frame is determined as an error because its contrast is too low to detect, but can be highly similar to the motion vector. In this case, the vector frame that is determined as the error is included in the target image. FIG. 15C illustrates this result.

When the target image includes all vector detection frames smaller than the first threshold, the CPU 103 determines whether the target image is smaller than the predetermined size in the step S23.

When the target image is smaller than the predetermined size, the CPU 103 determines a target image with a motion vector difference smaller than a second threshold that is higher than the first threshold so as to maintain the matching precision of the target image in the step S24. Thus, when the target image is smaller than the predetermined size in setting the target image so as to contain the motion vector smaller than the first threshold, the target image is reset so as to contain the motion vector smaller than the second threshold higher than the first threshold. This embodiment sets the second threshold to "10."

FIG. 15D illustrates a rectangular target image that contains the vector detection frames smaller than the second threshold. When the target image includes all vector detection frames smaller than the second threshold, the CPU 103 again determines whether the target image is smaller than the predetermined size in the step S25.

When the target image is smaller than the predetermined size in the step S25, the process ends without using the target image.

When the target image candidates are equal to or larger than the predetermined size in the steps S23 and S25, the calculated target image 307 is stored in the primary storage unit 104.

As described above, since the target image having a similar vector addressed by the user is extracted from the previous frame, the CPU 103 calculates the position of the target image in the current frame.

Figure 16:
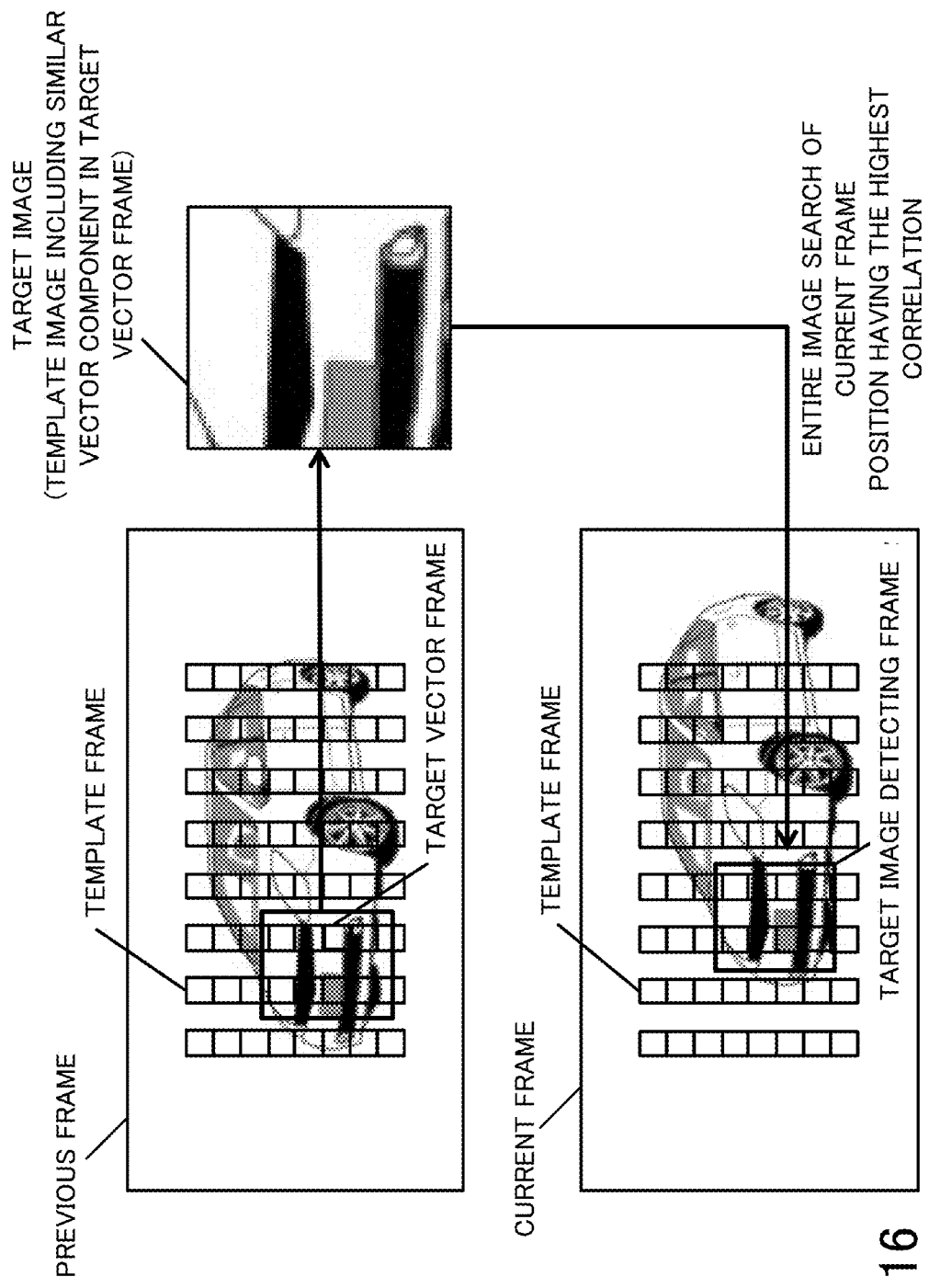
FIG. 16 is a view for explaining a detection of a target image position according to the embodiments of the present invention.

FIG. 16 is an overview of a series of processes in the target image position calculation.

The CPU 103 inputs the target image 307 and the current frame 200 stored in the primary storage unit 104, in the pattern matching processor 308, and calculates the position having the highest correlation with the target image based on all images in the current frame using the template matching method in the step S26.

Finally, the CPU 103 stores the position having the highest correlation as the target image position information 309 in the primary storage unit 104.

Figure 17:
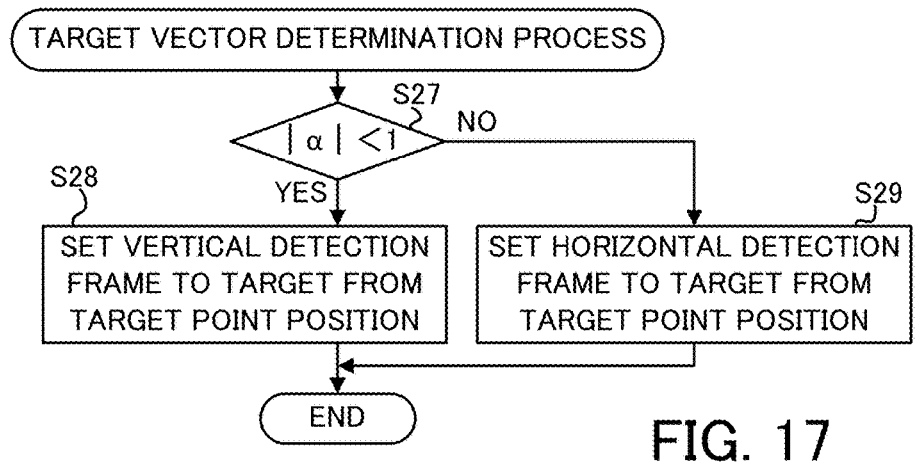
FIG. 17 is a flowchart of a target vector determination process according to the first embodiment.
Figure 18:
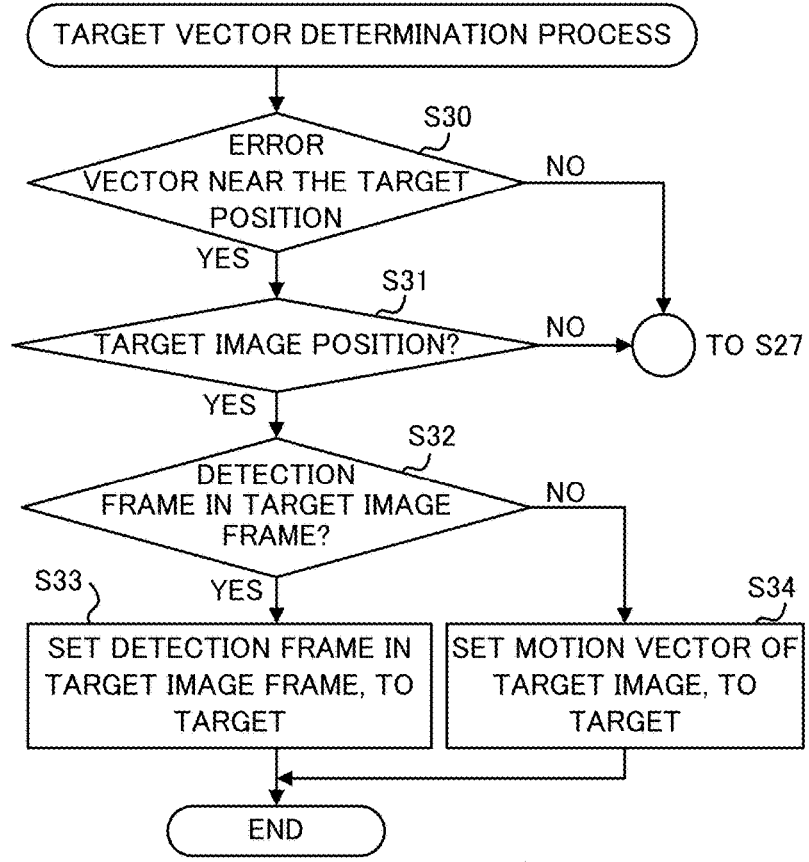
FIG. 18 is a flowchart of a target vector determination process according to the first embodiment.

Referring now to FIGS. 17 and 18, a description will be given of the target vector determination process by the target vector determiner 404. FIG. 17 is a flowchart of the target vector determination process when the motion vector is sufficiently detected.

When the target vector determination process starts, the CPU 103 determines the moving direction in the step S27. This embodiment determines that the moving direction of the object is horizontal, when the slope α calculated by the moving direction calculator 401 is smaller than 1. Otherwise, the moving direction of the object is determined vertical.

When the slope α is smaller than 1, the CPU 103 sets to a target, a detection frame next to the detection frame in the vertical direction and set as the target point in the step S28.

When the slope α is larger than 1, the CPU 103 sets to a target, a detection frame next to the detection frame in the horizontal direction and set as the target point in the step S29.

Thus, the CPU 103 sets to a target, a detection frame located in the horizontal direction (first direction) or a vertical direction (second direction orthogonal to the first direction) from a position (detection frame) closest to the target point, in the target image (image area). More specifically, an angle between the horizontal direction and the moving direction of the object is smaller than an angle between the vertical direction and the moving direction of the object, the detection frame located in the vertical direction is set to the target. When the an angle between the vertical direction and the moving direction of the object is smaller than an angle between the horizontal direction and the moving direction of the object, the detection frame located in the horizontal direction is set to the target. The image stabilizing control is performed based on a motion vector (target vector) obtained with the detection frame located in the target direction.

The angular velocity of the object at the target point can be precisely calculated by setting the object vector, as described above. The motion vector may be incorrectly detected due to the low contrast or the repetitive pattern.

FIG. 18 is a flowchart of the target vector determination process when the motion vector of the object at the target point cannot be correctly detected.

When the target vector determination process starts, the CPU 103 determines whether the vicinity of the detection frame that is set as the target point is the object that cannot be correctly detected in the step S30. This determination method may rely on the error vector detection number around the target point, or the error vector ratio to the detection frame, or any other methods.

When the vicinity of the target point is not determined as an error vector in the step S30, the flow moves to the step S27.

When the vicinity of the target point is determined as an error vector in the step S30, the CPU 103 determines whether the target image position information 309 is stored in the primary storage unit 104 in the step S31. When there is no target image position information 309, the flow moves to the step S27.

When there is the target image position information 309, the CPU 103 determines whether there is a detection frame for the object vector in the target image frame in the step S32. The target image frame is an image area containing the target image with a center at the target image position.

When there is an object vector frame in the target image frame in the step S32, the CPU 103 sets the detection frame in the target image frame to the target in the step S33.

When there is no object vector frame in the target image frame in the step S32, the CPU 103 calculates as the motion vector the difference between the target image position in the previous frame and the target image position in the current frame and sets it to the target in the step S34.

Thus, the target vector determiner 404 determines the target vector based on the target point and the moving direction of the object when the motion vector near the target point is highly reliable. When the motion vector near the target point is little reliable, the target vector is determined based on the moving direction of the object and the target image position information.

The target vector determination process thus ends.

Figure 19:
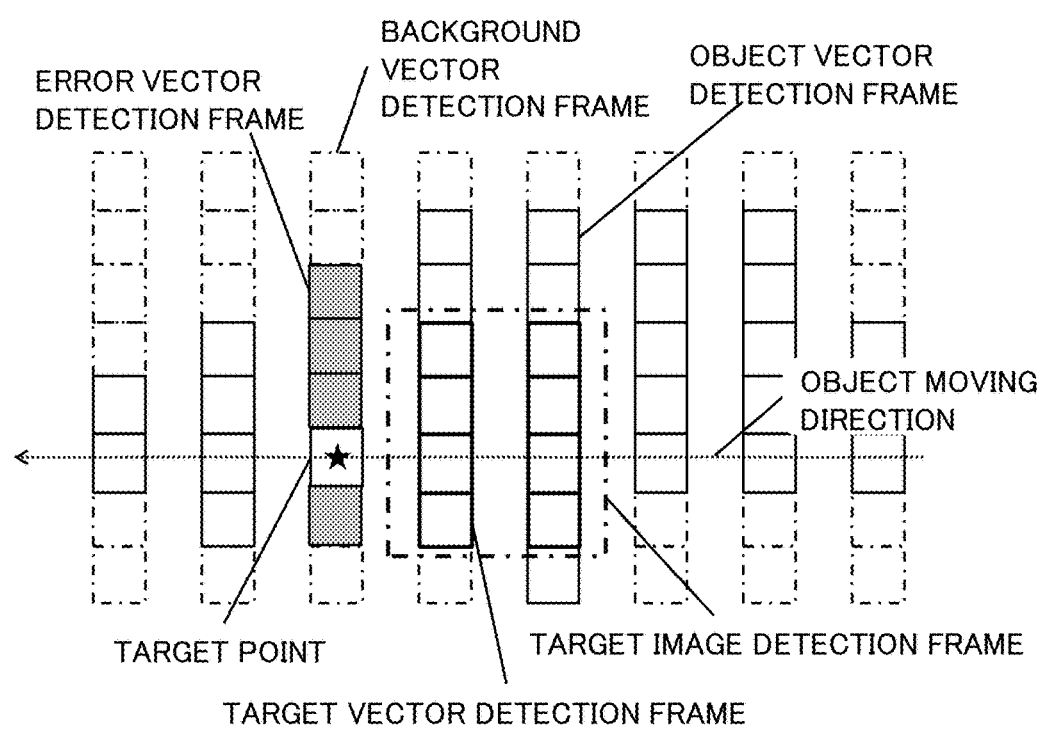
FIG. 19 is a view for explaining a target vector determination according to the first embodiment.

FIG. 19 illustrates an illustrative target vector determination.

A rectangle represents a detection frame for the motion vector. An alternate long and shot dash line represents the detection frame determined as a background vector in the step S18. A solid line represents the detection result determined as the object vector in the step S20. A dotted arrow represents a moving direction of the object. In the example illustrated in FIG. 19, α is 0 and the object moves to the right. A star represents the position (detection frame) determined as the target point by the target point determiner 403. When there is a detection frame determined as an error vector near the target point, the step S30 is executed in the target vector determination process. The step S30 sets to the target the detection frame in the target image frame using the target image position information, because there are many error vectors near the target point. More specifically, when the motion vectors are error vectors in the object vector detection frames in the vertical direction from the position (detection frame) determined closest to the target point, as illustrated in FIG. 19, the detection frame located in the horizontal direction from the star position is set to the target in the target image. A thick frame represents a set detection frame. Finally, the angular velocity is calculated using the motion vector detected with the detection frame set as the target. The CPU 103 performs the image stabilizing process so as to eliminate the blur of the image of the object based on the difference between the calculated angular velocity of the object and the angular velocity acquired from the angular velocity sensor 105.

Thus, the CPU 103 sets the image area (target image) in accordance with the motion vector of the main object and the target point in the image acquired by the image sensor 102, and provides the image stabilizing control based on the image area. More specifically, the CPU 103 sets an image area having a motion vector similar to that detected at the position (detection frame) closest to the target point in the motion vectors of the main object, and provides the image stabilizing control based on the motion vector (target vector) in the image area. Since the target vector is thus set, the CPU 103 can precisely calculate the angular velocity of the object at the target point even when the motion vector cannot be correctly detected due to the low contrast component and the repetitive pattern near the target point. Therefore, the follow shot using the angular velocity can provide a follow shot image in which the target point does not blur. In other words, the follow shot assistance can provide an image in which the spot to be stopped by the photographer does not blur.

Second Embodiment

Referring now to FIG. 20, a description will be given of the target image position calculation process in the step S12 according to the second embodiment.

While the first embodiment calculates a target image based only on the vector difference of the target vector frame irrespective of the horizontal and vertical directions, the target vector may be set in a direction orthogonal to the object moving direction in order to precisely detect the angular velocity of the object as described above.

The first embodiment can also set a target image that is long in the vertical direction when the object moves in the horizontal direction, since the motion vector difference of the target vector frame is smaller in the vertical direction. As a result, the target vector located in the vertical direction from the target point can be used, but this is not the case due to influence of the vector detection error.

Thus, the second embodiment uses a method for utilizing the moving direction of the object to determine the target image.

When the target image calculation process starts, the CPU 103 inputs the previous frame 201, the motion vector information 203, and the distance measuring position information (distance measuring frame information) 402 stored in the primary storage unit 104, into the target image determiner 306, and extracts the target image from part of the previous frame image.

Initially, the CPU 103 determines the target vector frame in the step S21. This embodiment sets the position of the target vector frame to the center coordinate of the detection frame in which a distance between the center of the input distance measuring position and the center of the detection frame coordinate is minimum. This embodiment uses the distance measuring position information 402 as an input of the target point determination, but the target point determination is not limited to the measuring distance position. For example, the face detection result or the object area detection result may be input.

Next, the CPU 103 calculates a difference from the motion vector detected with the target vector frame, based on the motion vector information 203. The difference from the motion vector may use both the vertical and the horizontal directions or only the vector component in the panning direction of the camera.

Figures 20A, 20B, 20C, 20D:
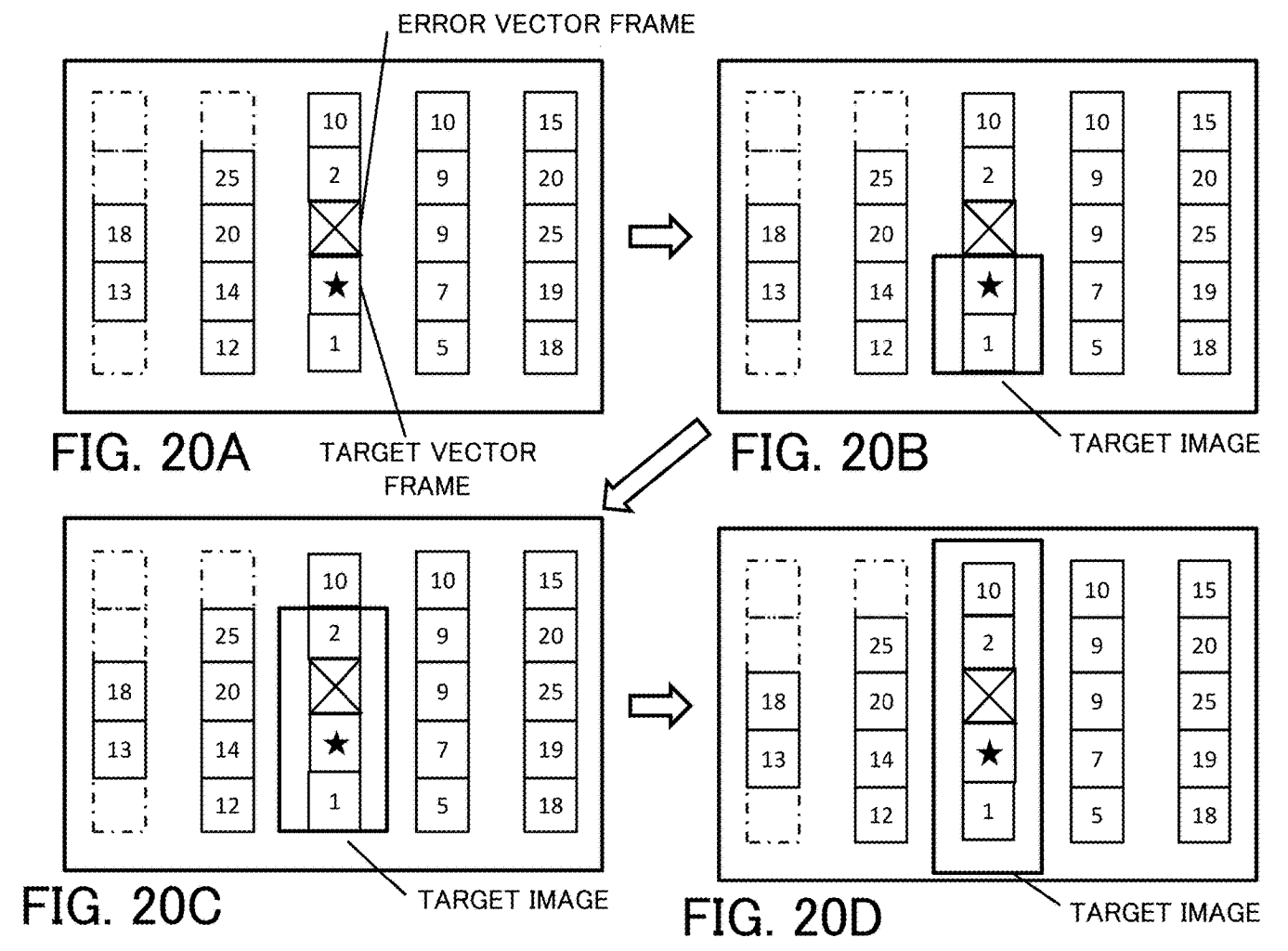

FIG. 20A is a view illustrating a difference of a motion vector near the target vector frame. A numerical value described in the frame represents the vector difference from the target vector frame.

The CPU 103 determines a similar motion vector based on the detection frame next to the target vector frame, and sets to the target image, a rectangular area that contains the vector detection frame that is determined similar.

In the step S22, the CPU 103 determines a target image having a motion vector difference smaller than the first threshold. This embodiment sets the first threshold to "5."

This embodiment weights a coefficient to be multiplied to a reference value based on the motion vector direction of the object. In other words, the threshold is increased in a direction orthogonal to the target vector frame and decreased in the direction parallel to the target vector frame. This configuration can determine the target image having many image components orthogonal to the target vector frame.

This embodiment sets a weighting coefficient for the horizontal direction to "½" and a weighting coefficient for the vertical direction to "2," where the object moves in the horizontal direction. As a result, the first threshold for the horizontal direction is "2.5," and the first threshold for the vertical direction is "10." Thus, the first threshold in this embodiment becomes a value made by multiplying the reference value "5" by a weighting coefficient, and the weighting coefficients are different between the horizontal direction (first direction) and the vertical direction (second direction). More specifically, the weighting coefficient for the horizontal direction is set smaller than that for the vertical direction when the angle between the horizontal direction and the moving direction of the object is smaller than the angle between the vertical direction and the moving direction of the object. On the other hand, the weighting coefficient for the vertical direction is set smaller than that in the horizontal direction when the angle between the vertical direction and the moving direction of the object is smaller than the angle between the horizontal direction and the moving direction of the object.

The vector detection frame located under the target vector frame has a motion vector difference of 1 smaller than the first threshold for the vertical direction, and FIG. 20B illustrates the result that contains the target image in the detection frame.

The vector detection frame above the target vector frame is determined as an error, but the next upper vector frame above the target vector frame has a vector difference of 2 smaller than the first threshold for the vertical direction. It is estimated that the vector frame is determined as an error because its contrast is too low to detect, but can be highly similar to the motion vector. In such a case, the target image contains the vector frame that has been determined to be an error. FIG. 20C illustrates this result.

When the target image includes all vector detection frames smaller than the first threshold, the CPU 103 determines whether the target image is smaller than the predetermined size in the step S23.

When the target image is smaller than the predetermined size, the CPU 103 determines a target image with a motion vector difference smaller than the second threshold that is higher than the first threshold so as to maintain the matching precision of the target image in the step S24. This embodiment sets the second threshold to "10."

When the same coefficient as that for the first threshold is multiplied, the second threshold for the horizontal direction becomes "5" and the second threshold for the vertical direction becomes "20." In other words, the second threshold in this embodiment is a value made by multiplying the reference value "20" by the weighting coefficient, and the weighting coefficients are different between the horizontal direction (first direction) and the vertical direction (second direction). More specifically, the weighting coefficient for the horizontal direction is set smaller than that for the vertical direction when the angle between the horizontal direction and the moving direction of the object is smaller than the angle between the vertical direction and the moving direction of the object. On the other hand, the weighting coefficient for the vertical direction is set smaller than that for the horizontal direction when the angle between the vertical direction and the moving direction of the object is smaller than the angle between the horizontal direction and the moving direction of the object.

There is no vector frame smaller than the second threshold for the horizontal direction, located on the left and right sides of the target image illustrated in FIG. 20C, whereas the vector frame difference above the target image is 10 smaller than the second threshold for the vertical direction and thus included in the target image.

FIG. 20D illustrates the rectangular target image that contains the vector detection frames smaller than the second threshold. When the target image includes all vector detection frames smaller than the second threshold, the CPU 103 again determines whether the target image is smaller than the predetermined size in the step S25.

When the target image is smaller than the predetermined size in the step S25, the process ends without using the target image.

When the target image candidates are equal to or larger than the predetermined size in the steps S23 and S25, the calculated target image 307 is stored in the primary storage unit 104.

As described above, since the target image having a similar vector addressed by the user is extracted from the previous frame, the CPU 103 calculates the position of the target image in the current frame.

Figure 21:
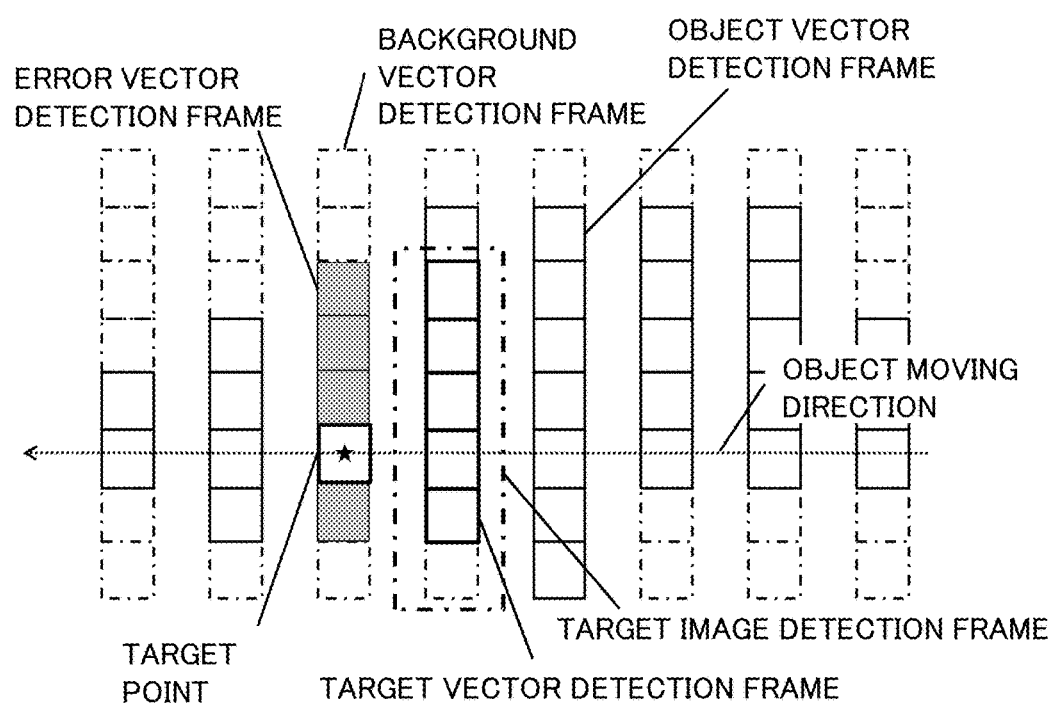
FIG. 21 is a view for explaining a target vector determination according to the second embodiment.
Figure 22:
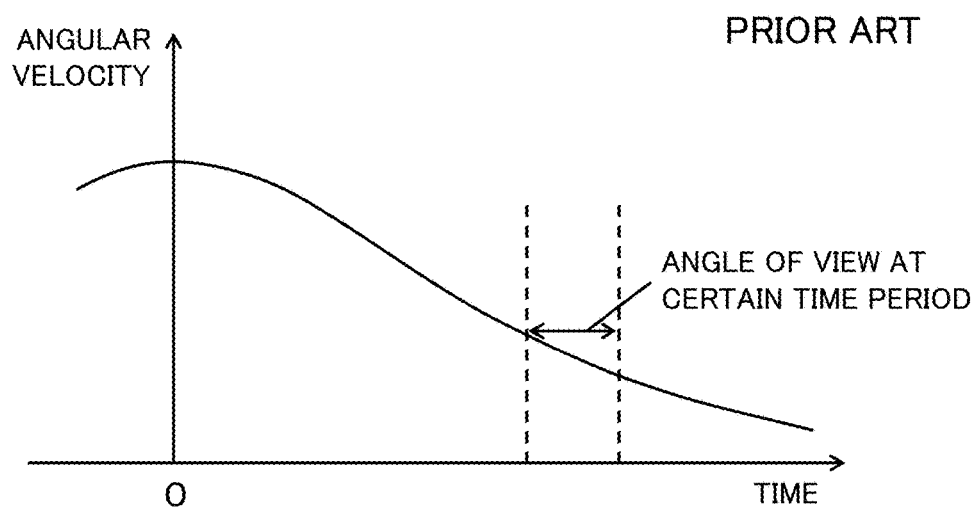
FIG. 22 is a graph representing a relationship between time and an angular velocity of an object that provides a uniform linear motion.
Figure 23:
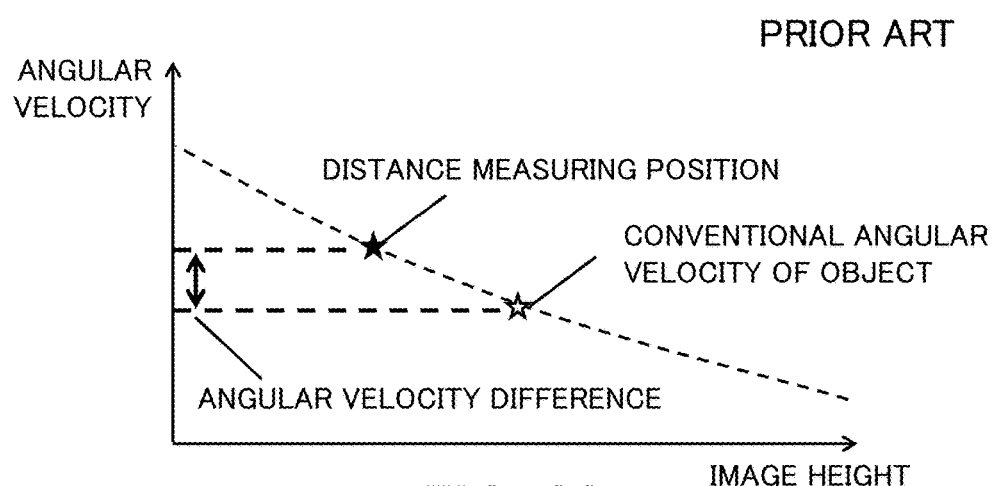
FIG. 23 is a graph representing a relationship between an image height and an angular velocity in an angle of view.

FIG. 21 illustrates an illustrative target vector determination. A rectangle represents a detection frame for the motion vector. An alternate long and shot dash line represents the detection frame determined as a background vector in the step S18. A solid line represents the detection result determined as the object vector in the step S20. A dotted arrow represents a moving direction of the object. In the example illustrated in FIG. 21, α is 0 and the object moves to the right. A star represents the position (detection frame) determined as the target point by the target point determiner 403. When there is a detection frame determined as an error vector near the target point, the step S30 is executed in the target vector determination process. The step S30 sets to the target, the detection frame in the target image frame using the target image position information, because there are many error vectors near the target point.

When this embodiment is compared with the target vector determination in the first embodiment illustrated in FIG. 19, many target vectors can be set in the vertical direction.

Finally, the angular velocity of the object is calculated using the motion vector detected with the set detection frame as the target.

Setting the target vector in this way can prevent the same directional component as the motion direction of the object from increasing in the target image, and the target vector required by the user can be easily detected from the target image. The angular velocity of the object at the target point can be precisely calculated. Therefore, the follow shot using the angular velocity can provide a follow shot image in which the target point does not blur. In other words, the follow shot assistance can provide an image in which the spot to be stopped by the photographer does not blur.

This embodiment can provide a motion vector detection apparatus that can provide a follow shot assistance configured to prevent a spot in an image to be stopped by the photographer from blurring, even when the object has a motion vector that is hard to detect. In other words, the present invention can implement the image stabilizing control advantageous to the follow shot assistance.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention is applicable to an image pickup apparatus, such as a compact digital camera, a single lens reflex camera, and a video camera.

This application claims the benefit of Japanese Patent Application No. 2016-017752, filed Feb. 2, 2016, which is hereby incorporated by reference herein in its entirety.

What is claimed is:

1. An image pickup apparatus comprising:
a panning detection unit configured to detect a panning velocity of the image pickup apparatus;
a vector detection unit configured to detect motion vectors from a plurality of images acquired by an image sensor whose image pickup plane has a plurality of detection frames arranged in a first direction and a second direction orthogonal to the first direction;
a determination unit configured to determine a motion vector of an object among the motion vectors obtained from the detection frames;
a specifying unit configured to specify a target point in the images;
a control unit configured to set an image area in accordance with the motion vector of the object and the target point in the images and to drive an optical element so as to correct a difference between a moving velocity of the object and the panning velocity of the image pickup apparatus based on the image area; and
a calculation unit configured to calculate a moving direction of the object based on the motion vector of the object,
wherein the control unit drives the optical element based on the motion vector obtained from the detection frame located in the second direction when an angle between the first direction and the moving direction is smaller than an angle between the second direction and the moving direction, and
wherein each unit is implemented by one or more processors, circuitry or a combination thereof.

2. The image pickup apparatus according to claim 1, wherein the control unit drives the optical element based on the motion vector located in the first direction from the position closest to the target point in the image area, where the motion vector located in the second direction is an error vector.

3. The image pickup apparatus according to claim 1, wherein the specifying unit specifies the target point based on distance measuring position information.

4. The image pickup apparatus according to claim 1, wherein the specifying unit specifies the target point based on face position information of the object.

5. An image pickup apparatus comprising:
a panning detection unit configured to detect a panning velocity of the image pickup apparatus;
a vector detection unit configured to detect motion vectors from a plurality of images acquired by an image sensor whose image pickup plane has a plurality of detection frames arranged in a first direction and a second direction orthogonal to the first direction;
a determination unit configured to determine a motion vector of an object among the motion vectors obtained from the detection frames;
a specifying unit configured to specify a target point in the images;
a control unit configured to set an image area in accordance with the motion vector of the object and the target point in the images and to drive an optical element so as to correct a difference between a moving velocity of the object and the panning velocity of the image pickup apparatus based on the image area; and
a calculation unit configured to calculate a moving direction of the object based on the motion vector of the object, wherein the image area contains a motion vector that has a difference smaller than a first threshold, from the motion vector detected at a position closest to the target point, wherein the first threshold is a value made by multiplying a reference value by a weighting coefficient, and the weighting coefficient is different between the first direction and the second direction orthogonal to the first direction, and wherein each unit is implemented by one or more processors, circuitry or a combination thereof.

6. The image pickup apparatus according to claim 5, wherein the weighting coefficient for the first direction is smaller than that for the second direction when an angle between the first direction and the moving direction is smaller than an angle between the second direction and the moving direction.

7. The image pickup apparatus according to claim 5, wherein when the image area is set so as to contain a motion vector smaller than the first threshold and is smaller than the image area, the control unit sets the image area so as to contain a motion vector that has the difference smaller than a second threshold higher than the first threshold.

8. The image pickup apparatus according to claim 7, wherein the second threshold is a value made by multiplying a reference value by a weighting coefficient, and the weighting direction is different between the first direction and the second direction orthogonal to the first direction.

9. The image pickup apparatus according to claim 8, wherein the weighting coefficient for the first direction is smaller than that for the second direction when an angle between the first direction and the moving direction is smaller than an angle between the second direction and the moving direction.

10. A control method for an image pickup apparatus comprising the steps of:

detecting a panning velocity of the image pickup apparatus;

detecting motion vectors from a plurality of images acquired by an image sensor whose image pickup plane has a plurality of detection frames arranged in a first direction and a second direction orthogonal to the first direction;

determining a motion vector of an object among the motion vectors obtained from the detection frames;

specifying a target point which a user addresses in the images;

setting an image area in accordance with the motion vector of the object and the target point in the images and driving an optical element so as to correct a difference between a moving velocity of the object and the panning velocity of the image pickup apparatus based on the image area; and calculating a moving direction of the object based on the motion vector of the object, wherein the controlling step drives the optical element based on the motion vector obtained from the detection frame located in the second direction when an angle between the first direction and the moving direction is smaller than an angle between the second direction and the moving direction.

11. A non-transitory computer-readable storage unit for storing a program that enables a computer to execute a control method for an image pickup apparatus, the control method comprising the steps of:

detecting a panning velocity of the image pickup apparatus;

detecting motion vectors from a plurality of images acquired by an image sensor whose image pickup plane has a plurality of detection frames arranges in a first direction and a second direction orthogonal to the first direction;

determining a motion vector of an object among the motion vectors obtained from the detection frames;

specifying a target point which a user addresses in the images;

setting an image area in accordance with the motion vector of the object and the target point in the images and driving an optical element so as to correct a difference between a moving velocity of the object and the panning velocity of the image pickup apparatus based on the image area; and calculating a moving direction of the object based on the motion vector of the object, wherein the controlling step drives the optical element based on the motion vector obtained from the detection frame located in the second direction when an angle between the first direction and the moving direction is smaller than an angle between the second direction and the moving direction.

12. A control method for an image pickup apparatus comprising the steps of:

detecting a panning velocity of the image pickup apparatus;

detecting motion vectors from a plurality of images acquired by an image sensor whose image pickup plane has a plurality of detection frames arranged in a first direction and a second direction orthogonal to the first direction;

determining a motion vector of an object among the motion vectors obtained from the detection frames;

specifying a target point which a user addresses in the images;

setting an image area in accordance with the motion vector of the object and the target point in the images and driving an optical element so as to correct a difference between a moving velocity of the object and the panning velocity of the image pickup apparatus based on the image area; and calculating a moving direction of the object based on the motion vector of the object, wherein the image area contains a motion vector that has a difference smaller than a first threshold, from the motion vector detected at a position closest to the target point, wherein the first threshold is a value made by multiplying a reference value by a weighting coefficient, and the weighting coefficient is different between the first direction and the second direction orthogonal to the first direction.

13. A non-transitory computer-readable storage unit for storing a program that enables a computer to execute a control method for an image pickup apparatus, the control method comprising the steps of:

detecting a panning velocity of the image pickup apparatus;

detecting motion vectors from a plurality of images acquired by an image sensor whose image pickup plane has a plurality of detection frames arranged in a first direction and a second direction orthogonal to the first direction;

determining a motion vector of an object among the motion vectors obtained from the detection frames;

specifying a target point which a user addresses in the images;

setting an image area in accordance with the motion vector of the object and the target point in the images and driving an optical element so as to correct a difference between a moving velocity of the object and the panning velocity of the image pickup apparatus based on the image area; and calculating a moving direction of the object based on the motion vector of the object, wherein the image area contains a motion vector that has a difference smaller than a first threshold, from the motion vector detected at a position closest to the target point, wherein the first threshold is a value made by multiplying a reference value by a weighting coefficient, and the weighting coefficient is different between the first direction and the second direction orthogonal to the first direction.

* * * * *